United States Patent [19]
Engle

[11] 3,924,902
[45] Dec. 9, 1975

[54] BRAKING SYSTEM FOR A LIGHT RAIL VEHICLE

[75] Inventor: Thomas Engle, Cape Vincent, N.Y.

[73] Assignee: General Signal Corporation, Rochester, N.Y.

[22] Filed: June 17, 1974

[21] Appl. No.: 480,441

Related U.S. Application Data

[63] Continuation-in-part of Ser. No. 393,529, Aug. 31, 1973, Pat. No. 3,845,991.

[52] U.S. Cl. ............................ 303/21 A; 303/22 A
[51] Int. Cl.² ........................................... B60T 8/04
[58] Field of Search ......... 188/170, 181 A; 303/6 C, 303/3, 13, 15, 21 A, 22 R, 22 A, 21 P

[56] References Cited
UNITED STATES PATENTS

| | | | |
|---|---|---|---|
| 3,443,842 | 5/1969 | Pier | 303/21 A X |
| 3,501,203 | 3/1970 | Falk | 303/22 A X |
| 3,599,761 | 8/1971 | Schultz et al. | 188/170 |
| 3,658,390 | 4/1972 | Chouings | 303/21 A |
| 3,754,795 | 8/1973 | Von Lowis et al. | 303/22 A UX |
| 3,791,702 | 2/1974 | Burckhardt et al. | 303/21 A X |
| 3,799,297 | 3/1974 | Ryburn et al. | 188/170 |
| 3,833,271 | 9/1974 | Parfitt et al. | 303/21 A |

Primary Examiner—Duane A. Reger
Attorney, Agent, or Firm—Pollock, Philpitt & Vande Sande

[57] ABSTRACT

A brake system for a light rail vehicle having both dynamic and friction braking systems is disclosed. Further, this light rail vehicle has both motored and non-motored axles. The system has several individual and redundant systems which may act independently on each truck. The system uses a dynamic brake means which converts the propulsion motors to brake motors as the prime braking means for the motored axles. The system includes a fluid operated friction brake system with a proportional control means to supplement the dynamic braking with proportional friction braking as needed to achieve the total braking force required. The system includes an air spring and variable load means for each truck to regulate the maximum amount of fluid pressure available for the friction brake means to prevent over application of the friction brakes and skidding of the wheels. The system further includes parking brake and emergency brake means with independent actuators to effect actuation of the friction brakes.

16 Claims, 7 Drawing Figures

BRAKING SYSTEM FOR A LIGHT RAIL VEHICLE

CROSS-REFERENCE TO RELATED APPLICATION

This application is a continuation-in-part of Ser. No. 393,529 filed Aug. 31, 1973, now Pat. No. 3,845,991 issued Nov. 5, 1974.

BACKGROUND OF THE INVENTION

The present invention relates to a braking system for use on a light rail vehicle, and more particularly, a mass transit of rapid transit car. Relatively complex braking systems have been used for passenger cars in the past, but the new rapid transit cars are substantially lighter than either standard passenger cars or freight cars. This results in a substantial change in the load to empty weight ratio of the vehicle. The load to empty weight ratio for older style passenger cars and freight cars does not change appreciably even when the vehicle is fully loaded. However, light weight rapid transit cars may carry a load which is equal in weight to that of the car body itself. This change in the load to empty weight ratio, together with the frequent and rapid stops of the rapid transit cars require a relatively more complex and sophisticated braking system.

The system of the present invention is particularly intended for use in electrified vehicles wherein dynamic or regenerative braking is utilized. It is common practice to use the propulsion means of the vehicle as the braking means by exciting the traction motor fields and allowing the motor means to act as a generator when dynamic braking is required. The present invention is intended to provide a system which will combine the advantages of dynamic braking with the precision of friction braking through a proportional control system.

The wide disparity in empty weight to load ratios also creates additional problems in friction braking. The amount of force required to effect a given speed reduction for a heavily loaded vehicle which cause the wheels of a lightly loaded vehicle to slide on the rails. This not only reduces the effective braking, but also creates flat spots on the wheel which require repair or replacement of the wheel and a reduction of the inservice time of the car. Accordingly, it is necessary to use proportional braking systems that will limit the maximum braking effort of the friction brakes in accordance with the weight of the vehicle.

In recent years, rapid transit or mass transit cars have used air springs or air spring suspension systems rather than coil springs to support the vehicle. The air spring systems provide superior ride characteristics, and will also maintain the height of the car body a fixed distance above the tracks and the loading platform regardless of the load in the cars. The present invention presumes the use of air springs for the proportional braking system.

The present invention is also concerned with a parking brake for the vehicle. The engineering of the parking brake presents two problems for the designer. It is preferable to have a quick acting parking brake control separate from the friction brake control system to provide a redundancy for brake operation. Similarly, it is desired to have a hand brake control which can be applied without the necessity for external energy from any source other than the operator himself.

It is desirable to provide slip or skid detectors on mass transit or rapid transit vehicles. Since the stops are relatively frequent, and the train often encounters a variety of rail surfaces in a short distance, it is necessary to provide means for breaking the skid and reestablishing the brake force after the skid has been terminated.

It is also desirable to provide a completely redundant emergency brake system with a separate control system and separate actuators to effect application of the friction brakes in an emergency situation.

SUMMARY OF THE INVENTION

The braking system of the present invention is intended for use on a light rail vehicle of the mass transit or rapid transit variety. The braking system has several individual braking systems which may act independently and redundantly on each axle. More specifically, the brake system of the present invention utilizes an independent dynamic braking system and an independent pneumatically controlled proportional friction brake system. The present invention provides proportional control means for adding the proper amount of friction braking force to the force established by the dynamic brake system. The system uses the dynamic brake as a primary brake on motored axles, while using the friction brake on all non-motored axles so as to utilize the available adhesion on all wheels during stopping to provide the shortest stop distance without sliding wheels. On the motored axles the friction brake is energized only when the dynamic brake is incapable of producing the selected braking effort, and then only to the extent necessary to satisfy the deficiency.

The control system for the present invention also includes a "hand brake" or parking brake system with completely independent means for applying the friction brake. The parking brake utilizes a hydraulically restrained spring motor which actuates the braking pads when the parking brakes are applied. The parking brakes may be applied by merely venting or releasing the hydraulic motor which restrains the spring motor.

The emergency brake system for the present invention consists of means for applying the friction brake in the full service mode and also for applying track brakes. Thus, if the system is operating properly, the hydraulically restrained spring motor will never come into play. However, the hydraulic restraining pressure for the spring motor is connected to the service hydraulic brake cylinder line during emergency braking, so that should the service brake cylinder pressure fail, the fact of this failure would vent oil pressure from the hydraulically restrained spring motor and cause the spring applied brake to actuate. Use of the spring applied brake as a back-up during emergency brake applications assures that there can be no failure or combination of failures, which will deprive the car of an emergency brake. At the same time use of the normal full service brake as the emergency friction brake in the absence of failure assures that the braking will be consistent with vehicle weight; that is, will be load limited. The spring applied brake is not load limited, and thus would cause slipping wheels on a lightly loaded car with a possible consequence of increased stopping distance; thus, its use is relegated to a back-up brake to come on only in the event of a hydraulic or pneumatic failure.

In addition to the three redundant systems disclosed above, there are two additional systems which are capable of independent intervention in the application of the friction brakes. The first is the variable load system which regulates the amount of fluid pressure available to the friction brake actuating mechanism. A variable load valve and air spring are provided for each truck. The system uses the air spring pressure to produce an output pressure of a minimum threshold value, or of a value proportional to the air spring pressure above the threshold. This proportional application of pneumatic pressure matches the application of the friction brake to the weight of the car.

It is also an object of the present invention to provide a completely independent wheel slip subsystem to release the brakes on any sliding truck, and then reapply the brakes when the wheel slip has been terminated. This wheel slip subsystem operates by comparing the speeds of all axles on the car and if the speed of one of the axles exceeds that of the others by more than a predetermined amount, it energizes a dump valve on the skidding truck to release the brakes.

The present invention is intended to provide a brake system for light rail vehicles, wherein a dynamic or regenerative brake means generates a variable electric control signal upon application of the dynamic brake means. The system also includes a fluid operated friction brake means for the vehicle with an actuating mechanism which is responsive to variations in fluid pressure to actuate the friction brake means. The present invention also includes a fluid pressure responsive control means responsive to a variable electric control signal to provide variations in the fluid pressure applied to the friction brake means. The fluid pressure control means includes an electropneumatic pressure transducer which responds to the variations in the electrical control means to vary the fluid pressure supplied to the friction brake means. It is also an object of the present invention to provide an actuator for the friction brake comprising first and second pressure responsive hydraulic motors, with the first hydraulic motor responsive to positive fluid pressure variations to actuate the friction brake means. A spring motor is also provided and is responsive to reductions in hydraulic pressure supplied to the second hydraulic motor to actuate the braking means.

DESCRIPTION OF THE PREFERRED EMBODIMENT

To aid in understanding the present invention, the entire brake control system, and the interaction of the various related components will be described with respect to functional block diagram FIG. 1. Each of the various subsystems will then be described in detail in connection with the description of the structural components of that subsystem.

Figure 1:
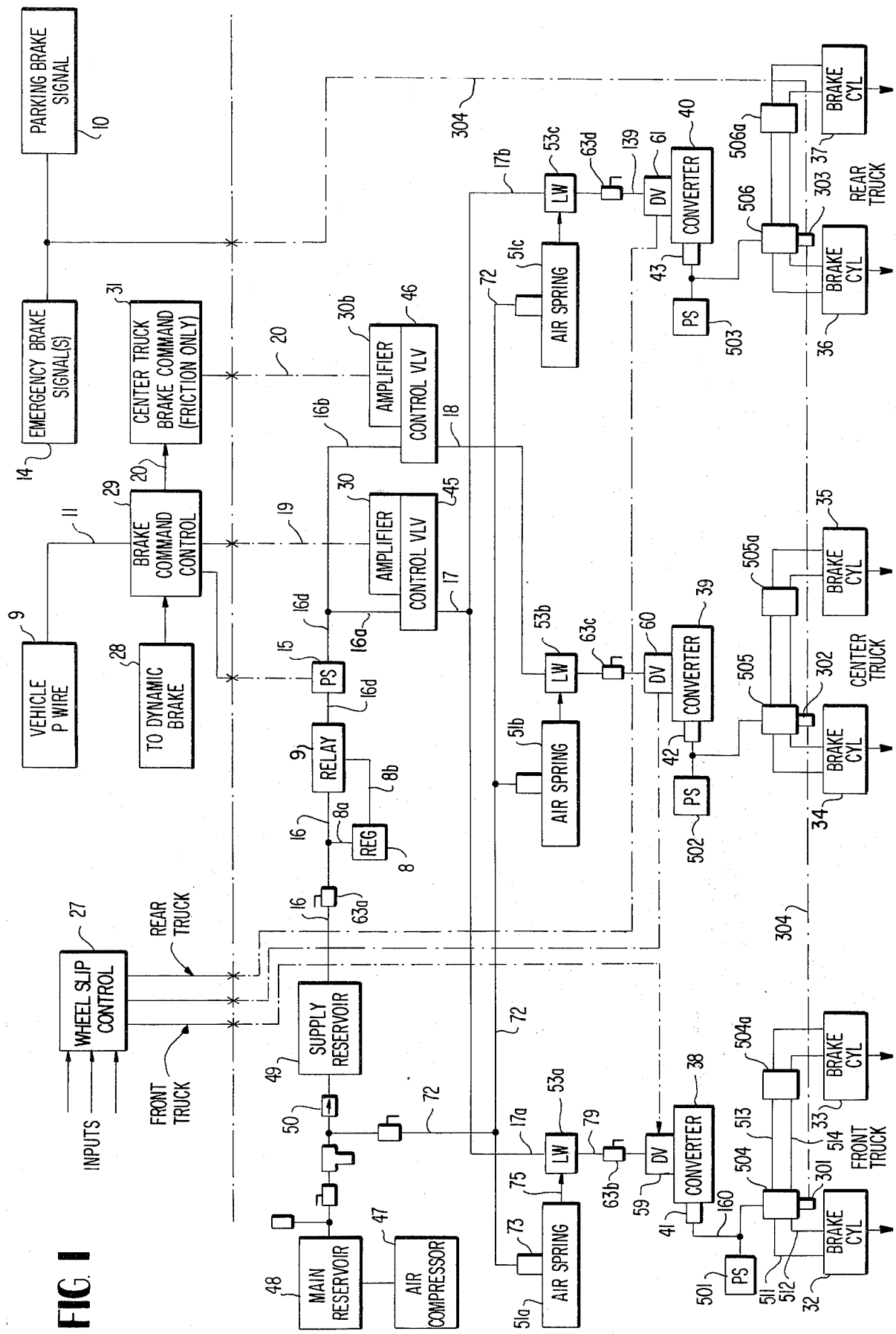
FIG. 1 is a functional block diagram of the interrelationship between the various components of the brake system of the present invention.

FIG. 1 illustrates the interrelationship between the electrical subsystem and the pneumatic subsystem. In addition, it illustrates the interrelationship between the three independent braking systems, and the two independent intervening systems. The three independent brake systems comprise the dynamic braking system, the pneumatically controlled friction brake system, and the independent emergency and parking brake control system. The independent intervening systems include the variable load system and the wheel slip detection and release system.

The braking system of the present invention is intended for use in mass transit or rapid transit, and will customarily involve only a limited number of cars. This is contrasted with conventional brake systems which are intended for use in freight or passengers trains involving 150 or 200 cars. In the light rail vehicle for which the preferred emobidment is intended, propulsion units and dynamic brakes 28 are included for at least the two end trucks of the vehicles. In addition, each of the dynamic brakes provides a signal feedback to a brake command control 29 which responds directly to changes in current in the control line system 11. The design of the command control and the dynamic brake may take many different forms, and the illustration in FIG. 1 is intended to be representative of a wide variety of forms. It is understood that the complete dynamic brake also includes a master controller (not shown) which is normally mounted in the lead unit of the train which permits the operator to switch the propulsion control circuits of the traction motors between motoring and dynamic braking configurations.

The present invention also includes a pneumatically controlled friction brake system utilizing friction brakes 32 and 33 for the front truck, 34 and 35 for the center truck, and 36 and 37 for the rear truck. The present invention uses a pneumatic control system and pneumatic to hydraulic convertors 38, 39 and 40 for converting the pneumatic control signals to hydraulic pressure. These convertors amplify the pneumatic signals and facilitate the use of hydraulic actuators 32–37. The hydraulic portion of the braking system also includes slack adjusters 41, 42 and 43 to provide the increased precision required with a fast response braking system.

Each of the pneumatically controlled friction brake motors is responsive to variations in pressure control. Each of the convertors 38–40 includes a pressure responsive fluid motor and a hydraulic motor. The fluid motor is responsive to positive variations in fluid pressure and actuates the hydraulic motor. The fluid pressure for the pneumatically controlled friction brake system is independently varied by two separate systems. The initial incoming air pressure is varied by the control valve 45 which provides a brake pressure output that is proportional to a reduction in electric current input below a preset level. This signal current is provided by a brake command control unit 29 and is reduced in response to an operator call for braking and increased by either an operator call for brake release, or in the case of powered (dynamically braked) axles by an increase in dynamic brake feedback current. In the brake system of the present invention, the dynamic brake is used as the primary brake on the powered axles and the friction brake is energized only when the dynamic brake is incapable of producing the necessary braking effort, and then only to the extent necessary to satisfy the deficiency. The control valve 45 is in electropneumatic pressure transducer which responds to control signals from the brake command control 29, to produce an output pressure which regulates a proportioning bypass valve. The control valve 45 provides a braking system which is able to increase and decrease the friction braking effort as required during a brake application to produce exactly the total braking effort called for by the operator through control line 11, regardless of the irregularities in the dynamic brake response attributable to speed effects or malfunctions.

The maximum fluid pressure that can be achieved is also independently varied by the variable load valves 53*a*, 53*b*, and 53*c*. The operation of the variable load circuitry will be subsequently described.

The control valve 45 controls the fluid pressure available to the motored end trucks of the vehicle, while control valve 46 provides fluid pressure for controlling the application of brakes 34, 35 on the non-motored center truck. This brake is applied independently of the dynamic braking applied to the end trucks. The center truck provides 20% of the braking effort, while the end trucks provide 40% at each truck. The system generates air for the pneumatic control system by means of air compressor 47 which feeds the main storage reservoir 48 and the braking reserve reservoir 49. This reservoir is protected against loss of air due to pipe breakage or compressor malfunction by check valve 50. It is also sufficiently large to provide 15 full service brake applications and releases with the air compressor 47 completely inoperative. Supply reservoir 49 supplies the pressure for the pneumatic control system which in turn actuates the friction brake system. The main reservoir 48 also supplies air pressure to the air springs 51*a*, 51*b*, and 51*c* located between the car trucks and the car body. Check valve 50 isolates the pneumatic control system for the variable load system, to prevent the loss of control pressure in the event of a rapture in one of the air springs, or a malfunction of one of the variable load components.

In normal operation, the variable load valves 53*a, b, c* regulate the maximum amount of pressure available to the pneumatic to hydraulic convertors 38–40. This is necessary since during a full brake application, a predetermined amount of braking force is applied to the wheels of the vehicle through the friction braking system to bring the vehicle to a stop as quickly and as safely as possible. It is important, however, that the braking force not be excessive since this would cause the wheels to slide on the tracks. The sliding and skidding results in the formation of flat spots on the wheels and a lengthening of the distance required to bring the car to a halt. Since the braking force required during a full brake application is proportional to the total weight of the car, including its load, it is necessary to provide means for measuring the load and regulating the brake cylinder pressure during a full service application. If this were not done, full braking force required for a fully loaded car would cause the wheels of an empty car to slide, or conversely the full braking force required for an empty car would be insufficient to quickly and safely stop a fully loaded car.

The car body is normally isolated from the trucks by means of air springs which serve several functions. The primary purpose is to provide a spring with ride characteristics which are superior to those of a coil spring. Additionally, the air spring mechanism will maintain the height of the car body a fixed distance above the tracks and the loading platform regardless of the load in the car. This is accomplished by varying the pressure of the air spring mechanism in accordance with the change in the load carried by the car body. The variable air pressure present in air spring 51*a*, 51*b*, and 51*c* may then be used to provide a proportional indication of the load carried by the vehicle itself. This variable pressure is used to pilot the variable load valves 53*a*, 53*b*, and 53*c* which will vary the amount of pressure supplied to the pneumatic to hyraulic convertors 38–40.

The brake system of the present invention also provides hydraulic actuators for the friction brakes which have first and second hydraulic motors arranged in tandem. The first hydraulic motor is responsive to positive variations in hydraulic pressure to actuate the disc brakes. The second hydraulic motor is responsive to reductions in hydraulic pressure to release a spring motor means mounted in the brake cylinder. The spring motor means effects a mechanical application of the brake pads to the brake disc.

The first hydraulic motor means is actuated by the control system previously discussed. The electric or electronic control signals are translated to pneumatic control signals which in turn actuate the pneumatic to hydraulic convertors 38–40. These convertors provide positive variations in the hydraulic pressure supplied to the first motor means mounted in the brake cylinders 32–37. This system is proportional and applies a graduated brake application depending upon speed, load, and dynamic braking available.

As will be subsequently explained, the emergency backup and parking brake control system comprises a completely separate subsystem that operates independently of the service brake control system. Both the emergency backup brake system and the parking brake systems use the spring motor means and the second hydraulic motor means. Each is applied by de-energizing the emergency magnet valve which in the absence of service brake cylinder pressure will reduce the hydraulic pressure in the second hydraulic motor means. This pressure is released by said emergency magnet valves 301–303 attached to each of the vehicle trucks. These valves are normally closed, zero leakage magnet valves which establish communication between the second fluid motor and the hydraulic supply line. If no pressure is present on the supply line, the trapped pressure is quickly dissipated through the convertors 38–40. If a service brake application is in progress, the pressure is equalized to prevent an over application of brake pressure and subsequent skidding of the vehicle.

A sub-system is also provided for recharging the second hydraulic motor during each service brake application. This insures adequate pressure in the second hydraulic motor means and prevents inadvertent applications of the emergency brakes through leakage.

Exhaust valves 301–303 are actuated by an electric signal impressed on control line 304 by either the emergency brake control 14 or the parking brake control 10. In addition, means are also provided for releasing the brakes manually when desired.

The braking system of the present invention is also provided with a wheel slip or skid detection system comprising the wheel slip detector logic circuitry 27, and wheel slip dump valves 59, 60 and 61. The logic circuitry 27 will detect differences in speed between the axles on the various trucks to signal for a reduction in with the dynamic brake system, or the friction brake system. The requirements for fail safe operation are met through having normally de-energized relays to provide the circuit connections between the wheel slip logic 27 and the dynamic brakes 28 and 29, and normally de-energized dump valves 59–61. The logic control circuitry further provides electrical timing means for the dump valves which prevents their remaining open for more than a set period after energization. Thus, when a skid is detected, the dump valves are energized, and release the pneumatic pressure in the pneumatic to hydraulic convertor for the slipping or skidding truck. The convertor on the affected truck or trucks is dumped for the length of time necessary to correct the slip, but not longer than the preset period.

The wheel slip detectors utilize signal inputs from four magnetic pickup sensors. The logic circuitry 27 amplifies, shapes and compares the low level signal pulses from the wheel slip detectors. While the detection system will operate to produce a spin or slide indication when any axle is rotating at a speed different from that of any other axle by more than a small amount, there is also a provision to detect situations in which all wheels slide simultaneously at synchronous speeds. This is done by detecting the change in rate of angular acceleration. The system measures the acceleration of one axle and when triggered will cause the detector to operate and send a dump signal to a signal dump valve. The dump valve operation will correct the skid for only one truck, but as soon as that truck begins to correct its slide, the synchronism is broken and the other detectors will actuate their respective dump valves.

The system also includes a service brake cut-out valve 63a, for completely de-energizing the friction brake system. The cut-out valve is used for towing and or completing the mission in the event of malfunction of one of the braking systems. Manual cut-out is also provided to each truck on a per truck basis by cut-out valves 63b, 63c and 63d.

PROPORTIONAL CONTROL SYSTEM

The proportional control system of the present invention has three independent subsystems. The first employs a proportional control valve to mix the friction braking with the dynamic braking for the end trucks. The second applies a "friction only" brake effort to the center truck. The third proportional system includes air springs and variable load valves for each of the vehicle trucks.

In operation, the vehicle P wire control 9 supplies a variable signal from 0 to 10 volts to the brake command control center. The center adjusts a number of factors including the total vehicle load weight, the jerk limit for the train, and the amount of dynamic brake feedback received from the dyanmic brake means. The control center then supplies a graduated signal to the proportional control valve 45. The amplifier 30 boosts the incoming control signal to a 0 to 20 volt range for use by the proportional control valve. The proportional control valve receives a predetermined input pressure from conduits 16 and 16a of approximately 100 psi. The proportional control valve produces an output pressure which increases as the voltage from amplifier 30 decreases from the prescribed level. This proportional control valve uses many of the components described and illustrated in my U.S. Pat. Nos. 3,528,709, Electric Current to Pneumatic Pressure Transducer, 3,536,360 and 3,536,361 entitled "Blending Scheme for Current Responsive Railway Brake", the disclosures of which are incorporated herein by reference. In this system application, the blending of dynamic brake effort and friction brake effort takes place in the brake command control center 29, rather than in the control valve 45. Control valve 45 supplies a regulated pneumatic pressure output to conduit 17 which varies inversely with the amount of dynamic braking effected by dynamic braking means 28. The porportional control valve 34 supplies the pneumatic control pressure to the two end trucks of the vehicle via conduits 17a and 17b.

The center truck braking system employs a similar proportional control valve 46 to provide graduated applications of pneumatic brake pressure to the pneumatic to hydraulic convertor 39. The proportional control valve 46 receives an input pressure from conduit 61b, and supplies an output pressure to a conduit 18 to the center truck. The center truck has its own command center 31, which supplies a friction-only braking signal to the proportional control valve 46. This signal is derived from the brake command control center, and takes into consideration the vehicle's total load, weight and speed, but does not take into consideration the amount of dynamic brake feedback received from the dynamic brake means at the front and rear trucks. Thus the proportional control valve 46 may supply substantially more pneumatic pressure to the pneumatic to hydraulic convertor 39, than does the proportional control valve 45 to the pneumatic to hydraulic convertors 38 and 40. The proportioning action of the control valve includes a supply and exhaust valve that takes the input pressure from input line 16b and either exhausts the pressure to atmosphere through an exhaust port, or to the brake system for application of the friction brakes.

The proportioning control subsystem begins with the main pneumatic supply line 16 which exits from the system supply reservoir and the friction brake cut-out valve 63a. As illustrated in FIG. 1, the pressure is regulated by a pressure regulating valve 8 and a relay valve 9. The regulating input line 8a is maintained at the full supply pressure in the supply reservoir 49. The regulating valve establishes an output pressure indicative of the desired pressure level for the system. In the preferred embodiment this pressure level is 100 pounds per square inch. The output pressure at 8b is connected to the pilot control for relay valve 9. Relay valve 9 establishes this pilot pressure on the output conduit 16d. The pilot pressure at 16d is monitored by a pressure switch 15 which is in turn connected to an annunciator in the brake command control center.

Figure 2:
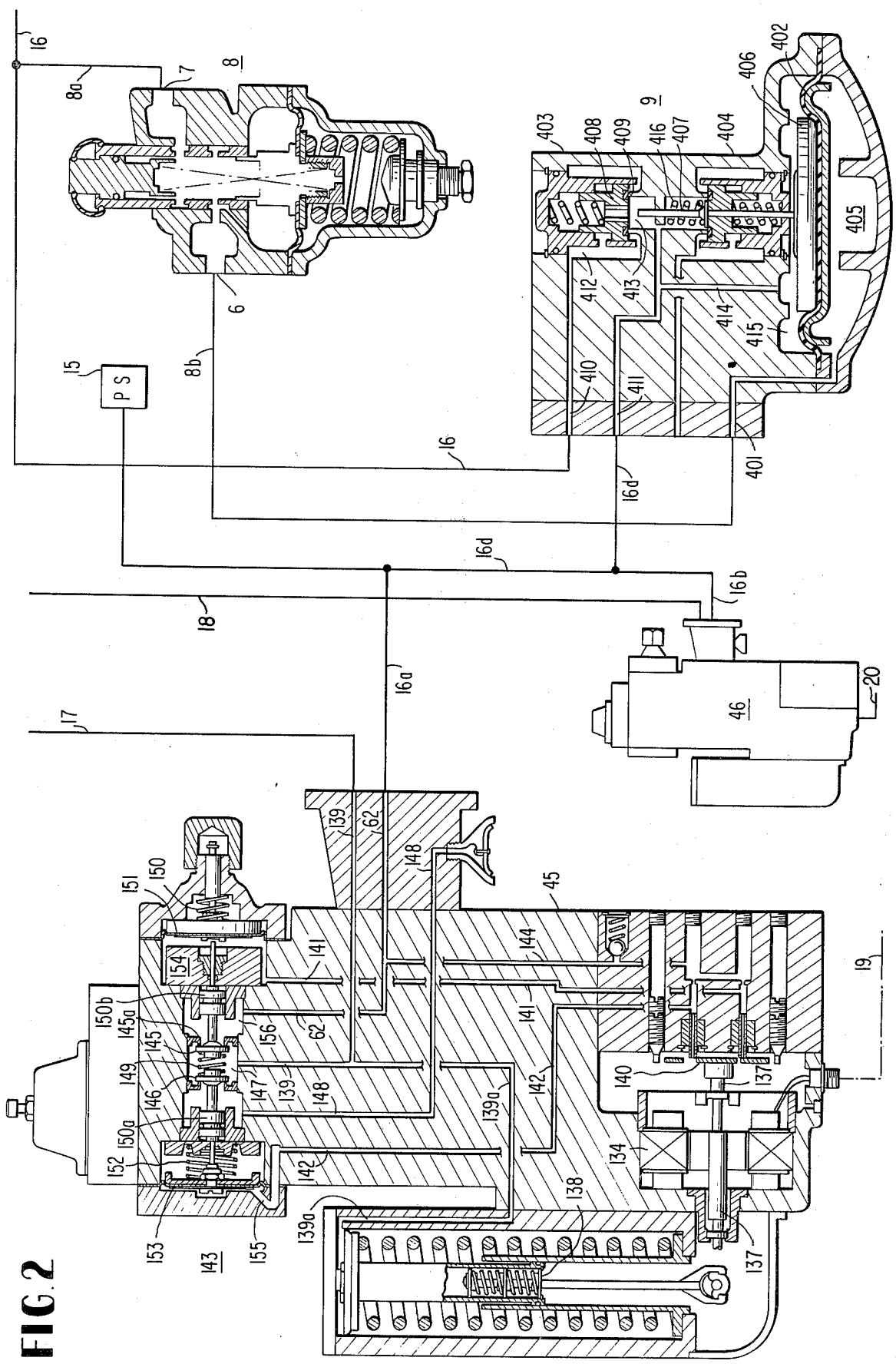
FIG. 2 is a cross sectional and schematic view of the air pressure control manifold, and the fluid pressure proportional control valve.

Referring to FIG. 2, the incoming pressure is illustrated in the upper righthand corner of the drawing as pressure input line 16. A branch conduit 8a leads to the inlet port 7 of the pressure regulating valve 8. Pressure regulating valve 8 established a predetermined pressure, i.e. 100 pounds per square inch, at the outlet port 6 and the pilot control line 8b. This pilot pressure is communicated to the inlet port 401 of relay valve 9. Relay valve 9 is a conventional pneumatic relay valve which comprises a pilot diaphragm 402, a mainline inlet and exhaust valve 403, and a pilot supply and exhaust valve 404. As the pilot line pressure from input port 401 pressurizes chamber 405, the pilot diaphragm 402 and its backup piston 406 are driven upwardly as illustrated in FIG. 2 thereby displacing the main control rod 407. As 407 is driven upwardly, it lifts the main control valve 408 from its seat 409 thereby opening communication between the mainline inlet port 410, and the mainline exhaust port 411. The incoming air pressure from the mainline supply reservoir is communicated via conduit 16 to inlet port 410 and the annular supply chamber 412. When the mainline valve 408 is lifted, the pressure passes from the annular supply chamber 412 through the circular valve seat 409 to the mainline exhaust chamber 413 and the exhaust conduit 411. Simultaneously, a portion of this pressure is routed to the pilot control assembly through interior passageway 414. The output pressure present on conduit 411 passes through passageway 414 to the pilot balancing chamber 415. When the pressure in chamber 415 has reached the pressure in chamber 405, spring means 415 returns control rod 407 to its original position and allows the mainline control valve 408 to seat on valve seat 409. This closes any further communication between the mainline inlet port 410 and the mainline output port 411. The pilot control valve 404 is used to regulate or adjust the mainline output valve 403 in response to pressure variations on the pilot control passageway 401.

The pressure thus communicated to the output line 16d is equivalent to the pilot pressure established by the pressure control valve 8 on the pilot pressure line 8b. If the pressure is varied, the output pressure on line 16d is also varied.

The incoming pressure to control valve 45 is therefore established in the preferred embodiment of the invention at approximately 100 pounds per square inch. The proportional control valve used for valves 45 and 46 is essentially the same, and in FIG. 2, one of the valves has been illustrated in block form, while the other is illustrated in cross section.

Each of the blending control valve means employed in this system includes four main components. The first component is an electrical torque motor 134. Motor 134 responds to electrical signal variations in control line 19. The torque motor exerts a proportional torque on comparator shaft 137. The second component is a pneumatic torque motor 138 which applies to shaft 137 a resisting torque which decreases linearly with increases in the pressure applied to the friction brake system through output line 139a. The third component comprises a pilot valve assembly or pressure transducer 140 which is driven by shaft 137. It serves to control the pilot pressure in a pair of pilot passages 141 and 142. The fourth component comprises the supply and exhaust valve assembly 143 which serves to regulate the input pressure from manifold line 16a to the friction brake system in accordance with the pilot pressures produced in lines 141 and 142.

The electrical torque motor 134 is of known design and comprises a permanent magnet rotor which rotates within a wound stator. The direction in which the motor rotates depends upon the direction of current flow through the stator, and the motor circuits are so correlated that it always rotates in the same direction. The torque output of the motor is directly proportional to the magnitude of the current and the sine of the magnetic angle between adjacent unlike poles of the rotor and stator.

The output of these torque motors is connected directly to pneumatic torque motor 138. The operation of this torque motor is fully explained in my previous U.S. Pat. No. 3,536,361, the disclosure of which is incorporated herein by reference. This torque motor provides a countervailing or balancing torque on shaft 137. When the pressure in output line 139a is at zero, pneumatic torque motor 138 is applying a spring loaded maximum torque output to shaft 137. Conversely, when a full service application is made, torque motor 138 applies a minimum torque. The force exerted on shaft 137 varies inversely with pressure, and is a negative function of transducer output pressure.

Pneumatic transducer 140 uses the combined output on shaft 137 to vary the pilot pressure supplied to the main supply and exhaust valve 143. The pneumatic transducer receives incoming pilot pressure from line 144. The pneumatic transducer responds to torque input on shaft 137 to provide three output conditions:

a. In the normal or application position, the transducer vents pilot pressure from the pilot passages 141 and 142.
b. At the extreme limit of angular rotation of shaft 137, pilot pressure is supplied to passages 141 and 142 and the transducer is in its released position.
c. In an intermediate position between *a* and *b* above, pilot passage 141 is pressurized and pilot passage 142 is vented. Any angular rotation out of this intermediate position, in the direction toward the limit of travel, will establish pressure in pilot passage 142, and operate the release valve to decrease pressure output. Rotation in the opposite sense, that is, toward the normal position will cause both pilot lines to be vented.

The main supply and exhaust valve 143 includes poppet type supply and exhaust valves 145 and 146 arranged to control flow from the main inlet input manifold 62 to the main brake control line 139 or to exhaust port 148 and the surrounding atmosphere. Supply and exhaust valves 145 and 146 are carried by spool portions 150a and 150b which reciprocate in axially aligned bores and are arranged so that if either valve (145 or 146) moves in either direction, it engages the other, and causes it to move in a valve closing direction. The opposite ends of each spool have equal cross sectional balancing areas and interconnected by passages extending through the spools. This renders both valves insensitive to changes in transducer outlet pressures. The supply and exhaust valves 145 and 146 are biased closed by compression spring 149 which is interposed between them. Each of the valves 145 and 146 may be shifted in its respective opening direction by first and second pilot motor means comprising compression spring 150 and diaphragm 151 (for valve 145) or by compression spring 152 and diaphragm means 153 (for valve 146). It should be noted that the corresponding parts of the two pilot motor means are reversed so that in one case the valve (145) is opened by the diaphragm motor. The arrangement of the parts is such that:

a. Spring 150 opens supply valve 145 and holds exhaust valve 146 closed when the pilot passages 141 and 142 and diaphragm motor chambers 154 and 155 are vented.
b. Diaphragm motor means 153 will open exhaust valve 146 and hold supply valve 145 closed when both diaphragm motors are pressurized.
c. Spring means 149 will close both the supply and exhaust valves when diaphragm motor chamber 154 is pressurized and diaphragm motor chamber 155 is vented.

These three conditions of the supply and exhaust valve 143 correspond directly to the three positions of the pneumatic transducer 140 referred to above.

Application of the dynamic brake and the friction brake may be accomplished through the brake command center 29. In the preferred embodiment of the invention, control circuitry 9 carries a constant voltage of 10 volts. A reduction in the voltage carried on control line 9 will effect a brake application. The 0–10 volt signal on line 9 is amplified to a 0–20 volt signal by amplifiers 30 and 30b. The application is proportional to the reduction in voltage below the 10 volt standard. For example, if the control circuitry voltage was zero, a full brake application would result. On the other hand, a 5 volt reduction would produce a proportionally smaller brake application. In the embodiment that is illustrated in FIGS. 1 and 2, the friction brakes for the end trucks are controlled by proportioning valve 45 which serves to adjust the effective braking force of the friction brakes to that of the dynamic brakes. The control sequence operates essentially in an additive manner from the control system signal present on line 9. Thus, if the control system voltage were reduced to zero, but the dynamic braking means indicated a 10 volt output from the dynamic brakes 28, the command center 29 would not call for friction brake application. On the other hand, if in the above example the dynamic brake voltage output was only 8 volts, the net voltage reduction of 2 volts would produce a call for a friction brake application of approximately 20%. This would be the amount required to produce a fully effective blended service brake application.

It should be noted that control line 9 is interconnected to the other cars of the train to effect uniform reduction and uniform braking for each of the cars. This may be accomplished in any one of several ways. A single control line may extend throughout the train, and supply the operating control signal for each of the brake systems for each of the cars. In an eight car train, there would normally be 16 proportional control valves drawing current from the control line 9. Therefore, it is desirable to utilize DC amplifiers 30 for each control valve which in turn supplies the operating voltage for torque motor 134.

When the brake system of FIG. 2 is in use, and propulsion controller is set in a motoring position, the circuits of the dynamic brake controller 28 will be in the motoring configuration and the voltage from the control center 29 will be at its maximum. The torque output of motor 134 will also be at its maximum and will maintain the comparator shaft 137 in a release position for transducer 140. All of the components of the supply and exhaust valve 134 will assume their illustrated position and the brake cylinder line 139 will be vented to atmosphere through port 148.

In order to apply the brakes, the operator shifts the propulsion controller to a coast position, thereby reducing the voltage in control line 9, and switching the circuits of the brake 28 to a braking configuration to establish a dynamic braking effort. Since the traction motors now act as generators, they supply voltage to brake command center 29. If the dynamic brake itself can satisfy the braking command, the signal output from the command center 29 will remain constant, and the comparator shaft 137 will remain in the extreme release position. In this case, the pneumatic transducer 140 will remain in a release position with pilot lines 141 and 142 pressurized and brake cylinder line 139 vented. If on the other hand, the dynamic brake is incapable of supplying the braking effort called for by control center 29, the reduction in the torque output of motor 134, and the pneumatic torque motor 138 will rotate comparative shaft 137 towards the apply position. As shaft 137 rotates towards the apply position, pneumatic tranducer 140 will vent the pressure present in pilot lines 141 and 142, and consequently the fluid pressure present in chambers 154 and 155. When this pressure is vented, spring means 150 will open valve 145, and simultaneously close exhaust valve 146. When valve 145 is moved from seat 145a it opens communication between inlet chamber 156, and outlet chamber 147, establishing communication between input manifold line 62 and brake line 139. Since the exhaust valve 146 has been closed, ar pressure will now be supplied to the friction braking means through brake line 139. As the pressure in 139 and 139a develops, the torque output of pneumatic torque motor 138 will be reduced, and the torque which it applies to comparator shaft 137 will be reduced. Accordingly, as the braking effort of the friction brake means approaches the level required to compensate for the deficiency in the output of the dynamic brake means, the electrical torque motors 134 will begin to rotate comparator shaft 137 towards the intermediate or lap position. When the sum of the outputs of the friction and dynamic braking means is equal to the selected braking effort, the torques exerted on shaft 137 will be balanced, and pressure transducer 140 will rest in an intermediate or lap position.

In the lap position, pilot passage 141 is pressured while pilot passage 142 is vented. As the pneumatic transducer moves to its lap position, the working pressure in chamber 154 will increase, and the diaphragm motor means 151 will overpower spring 150 allowing spring means 149 to close the supply valve 145.

After train speed has been reduced to a low level, the braking effort on the dynamic brake means will begin to "fade". This will reduce the amount of voltage supplied to the command center 29. When the train enters this portion of the braking cycle, the torque acting on comparator shaft 137 will again become unbalanced in the opposite direction and pneumatic torque motor 138 will shift the pressure transducer to an application position. This position will vent both of the working spaces 154 and 155 through pilot control lines 141 and 142 and allow spring means 150 to open supply valve 145 and close exhaust valve 146. Air under pressure will now be supplied through inlet chamber 156 and exhaust port 147 to brake line 139. As the pressure rises in brake line 139, the increased pressure will effect a reduction in the torque output of pneumatic torque motor 138. When the braking effort of the pneumatically operated friction brake is increased sufficiently to offset the decrease in the output of the dynamic brake due to fade the torque motors 134 and 138 will return the pneumatic transducer to a lap position.

In view of the foregoing discussion, it should be evident that, regardless of the effect of speed on dynamic braking effort, the system will always graduate the friction braking effort as needed to maintain the total braking effort required.

As was pointed out previously, the center truck is also braked by means of pneumatically controlled friction brakes. The proportional control valve 46 is identical to the proportional control valve 45, and operates in essentially the same manner as heretofore described for control valve 45. However, the brake command control center provides a decreasing control signal on electrical line 20 that is independent of the dynamic brake output. The control signal generated by the center truck brake command 31 will vary according to the speed of the train, and the vehicle load weight, but will not vary in accordance with dynamic brake output. When the voltage reduction is impressed on control line 9, it will be transmitted without mixing to the center truck command 31, and thereafter to amplifier 30b and control valve 46. During the dynamic braking effort, the two end trucks may be applying only 20 to 30% of the total air pressure available to the friction brake, while the center truck is applying a 100% braking effort to the friction brakes.

The Variable Load System

The variable load system of the present invention utilizes a separate air spring for each truck, and a separate variable load valve interposed between the proportional control valves 45 and 46, and the pneumatic to hydraulic convertors 38–40. As such, the variable load system is an independent intervening system which regulates the maximum amount of fluid pressure which may be supplied to the convertors 38–40.

Figure 3:
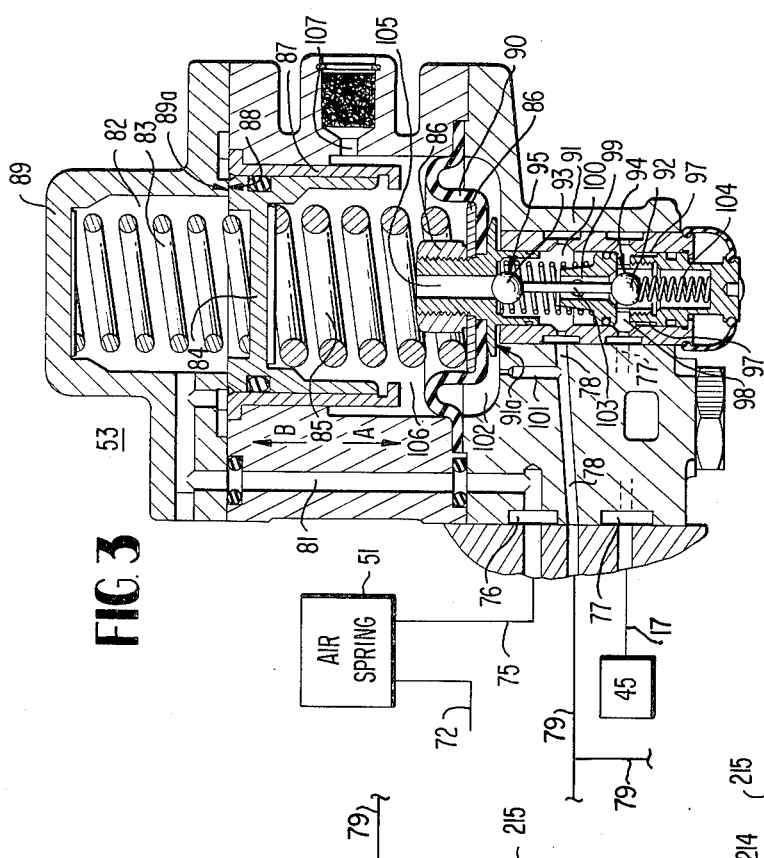
FIG. 3 is a cross sectional view of the variable load valve.

FIG. 3 illustrates in schematic and cross sectional form a portion of the variable load system of the present invention. The components of the variable load system are fully described in U.S. Pat. No. 3,730,597 entitled "Variable Load Rate Control Apparatus" assigned to the assignee of the present invention, the disclosure of which is incorporated herein by reference. The variable load system is regulated by the air springs 51a, 51b, and 51c which are illustrated schematically in FIG. 3 by air spring 51. The air spring 51 has been found to have superior ride characteristics to the coil spring, and supports the vehicle body on its respective truck. As the load of the vehicle increases, the air pressure maintained in air spring 51 is increased. This increase in air pressure is provided by piping 72 and a regulator. As the load of the vehicle goes up, the air pressure in the air spring must also go up to maintain the car body at a constant height. The variance in air pressure in air spring 51 between an empty load and full load is used to regulate the variable control valve 53.

The air spring mechanism 51 is usually in the form of one or more flexible bags located between the car body and the trucks. The regulating valve mechanism (not shown) is provided which is actuated in response to vertical movements of the car body caused by variations in the load of the car body to selectively increase or decrease the pressure in air spring 51. Thus, if the load on the car body increases, the car body moves downwardly towards the trucks and actuates the regulating valve mechanism (not shown) to increase the pressure in air spring 51. This increase in pressure then raises the car body back to its original predetermined height above the platform or rails. Conversely, if the load on the car decreases, the car body rises with respect to the trucks and actuates the regulating valve mechanism to decrease the pressure in the air spring 51 which in turn lowers the car back to its original predetermined height.

The variations in pressure present in air spring 51 are used to regulate the variable load control valve 53 illustrated in FIG. 3. As illustrated in FIG. 1, in coming air from the main reservoir passes through check valve 50, and enters supply reservoir 49 and air spring 51 through conduit 72. The output of the proportional control valves 45 and 46 is supplied via manifold 17 and 18 to the variable load valves 53a, 53b, and 53c, one of which is illustrated in FIG. 3. The incoming air pressure present on manifold line 72 is piped in a parallel manner to the three variable load valves.

The variable load valve receives a pilot pressure from the air spring via conduit 75, which enters valve 53 through inlet passage 76. Simultaneously, operating pressure from the proportioning valve 45 is supplied to the relay portion of variable load valve 53 through entry port 77, and is conveyed to the magnetic dump valve 59 via output manifold line 78, and conduit 79. Magnetic dump valve 59 is mounted to the housing of convertor 38, for reasons to be discussed; thus conduit 79 is also shown in phantom to convertor 38 in FIG. 4. In the preferred embodiment of the invention, the variable load valve is mounted on the exterior of the pneumatic to hydraulic convertor 38. An exploded view format has been used in FIGS. 3, 4 and 5 to clearly illustrate the interrelationship of the various components.

Variable load valve 53 is illustrated in an "empty" configuration. That is, the minimum amount of pressure is presented to the pilot portion of valve 53 via air spring 51. This minimum air pressure is conveyed to the variable load valve through conduit 75, inlet port 75, an inlet passageway 81, to the pilot chamber 82. This pilot pressure together with spring means 83 exerts a force acting in the direction of arrow A on the top of piston 84. Balancing this force is a force acting upwardly on the bottom of piston 84 exerted by spring 104 through valve body 92–93, retainer plate 86 and spring means 85. This same force is also exerted by spring 85 on retainer plate 86. Since the opposing forces of spring 85 are balanced, the piston is at rest at a predetermined location within the guide bore 87.

When the car is empty, the pilot pressure in chamber 82 is at its minimum, and the piston 84 will rest with its shoulder portion 88 in immediate abutment with the shoulder 89a of upper cap member 89. If the pressure in chamber 82 were at its maximum as in a fully loaded condition, the piston 84 would be driven in the direction of arrow A to cause the retainer plate 86 and control diaphragm 90 to abut the shoulder 91a of lower cap 91.

The relay portion of the variable load valve comprises supply valve 92, exhaust valve 93 and their associated valve seats 94 and 95. As illustrated in FIG. 3, supply valve 92 is open and air pressure entering inlet passageway 77 passes into chamber 97. From chamber 97 it enters the relay valve through transverse port 98 and passes between the supply valve 92 and its seat 94 to coaxial bore 99. From bore 99, it enters output chamber 100 and exits through output port 78. Air pressure in exhaust passage 100 will simultaneously traverse through interior port 101 to the control chamber 102 immediately below diaphragm 90.

The inlet and exhaust valves 92 and 93 are linked together by means of pin 103. As illustrated in FIG. 3, exhaust valve 93 is firmly seated against exhaust seat 95 by means of spring 104. At the same time, the interconnecting pin 103 has lifted input valve 92 from valve seat 94 to open the relay portion of the valve.

As the air pressure from the proportioning valve 45 passes through the relay valve portion of variable load valve 53, it pressurizes chamber 102 until the pressure therein is sufficient to compress springs 83 and 85 and move diaphragm 90 and retaining means 86 upwardly as indicated by arrow B. As retaining means 86 is moved upwardly, exhaust valve 93 is driven upwardly by pin 103, supply valve 92 and spring 104. When the pressure in chamber 102 has reached a predetermined level, supply valve 92 will seat at 94 and close coaxial bore passage 99.

As the vehicle is loaded, the air pressure present in air spring 51 will increase, and consequently the air pressure present in conduit 75, inlet port 76, inlet passage 81, and pilot chamber 82 will also increase. As this pressure increases, the pressure on piston 84 and the force of spring 83 will combine to move piston 84 downwardly in the direction of arrow A. As piston 84 moves in the direction of arrow A, it will move spring means 85 and retaining means 86 downwardly. Retaining means 86 will then unseat supply valve 92, allowing additional pressure to be transmitted to relay valve 52 and control chamber 102. Eventually, as piston 84 is moved downardly, the retaining means 86 will move into abutment with shoulder 91a of end cap 91. Any subsequent increases in pressure will only result in a further compression of spring 85. It should be noted that at this point, the pressure required in chamber 102 to move the diaphragm 90 and retaining means 86 upwardly as indicated by the arrow B will be substantially greater than it was for the empty car. The pressure in chamber 102 must rise to a force sufficient to overcome combined forces of spring 85 and/or spring 83 and the pressure in chamber 82 to reseat the supply valve 92. When such equilibrium is reached, the supply valve 92 will again close, shutting off passage 99.

It should be noted that the spring constants of springs 83 and 85 are very important. As discussed previously the pressure in air spring 51 varies according to a first relationship determined by the ratio of the load to the weight of the car body only, and not the rail vehicle itself. The pressure delivered to the convertor 38 varies however, according to a second and different relationship determined by the ratio of the load to the total weight of the vehicle. Accordingly, full braking pressure need not vary as greatly as the air spring pressure. In the preferred embodiment of the invention, the effective area of piston 84 and diaphragm 90 are substantially equal. The spring constant spring 85 however is larger than that of spring 83 by an amount which causes the full service brake pressure to vary in accordance with the second relationship, even though the air spring pressure varies according to the first relationship.

It should be pointed out that the pressure in air spring 51 will increase the decrease incrementally at each stop as passengers enter and leave the vehicle.

If the load of the vehicle is decreased, regulating means (not shown) will exhaust air from the air spring means 51. When pressure is reduced in the air spring 51, it is correspondingly reduced in pipe 75, inlet passage 76, and pilot chamber 82. As the pressure is reduced, the piston means 84 will move upwardly as indicated by the arrow B and the control pressure already present in control chamber 102 will move the diaphragm 90 and retaining means 86 upwardly as indicated by the arrow B. Since exhaust valve 93 is retrained in a fixed position by means of linking pin 103, and the seating of valve 92 upon valve seat 94, exhaust valve 93 will be upseated from its valve seat 95, and the excess pressure in control chamber 102 will be allowed to flow through the axial bore 105 into chamber 106 and out exhaust passage 107. This also serves to reduce the pressure in passageway 101, exhaust passage 78, manifold lines 79 and pneumatic to hydraulic convertor 38. When the control chamber 102 has been sufficiently vented, the spring 85 will overcome the pressure in chamber 102 and will again move retainer means 86 downwardly as indicated by the arrow A, and cause valve seat 95 to engage exhaust valve 93. As can be seen from the foregoing description, variable load valve 53 produces a variable pressure that is partially proportional to the pressure present in air spring 51, and the load carried by the vehicle. This difference in spring constants between spring 83 and spring 85 is provided to provide for the difference in load to weight ratios between the load and the car body as opposed to the ratio between the load and the weight of the vehicle. These pressures are proportionally reproduced in the brake cylinder by means of the pneumatic to hydraulic convertors.

The foregoing description has centered around the variable load system for the two end trucks of the vehicle. The same interrelationship exists for the center truck and control valve 46. The proportioning control valve 46 provides a variable output pressure which may in turn be modified by the variable load valve 53b. The operation of this valve is identical to the operation of valve 53a hereinbefore described in detail.

The Pneumatic to Hydraulic Convertors

Figure 4:
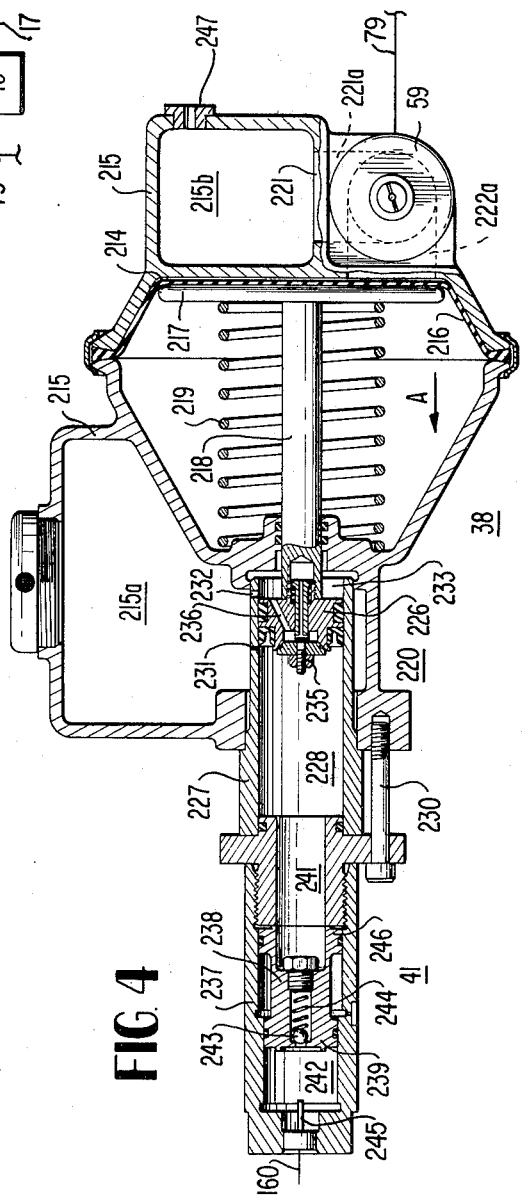
FIG. 4 is a cross sectional view of the pneumatic to hydraulic converter and dump chamber.

FIG. 4 is a cross-sectioned and diagrammatical representation of the pneumatic to hydraulic convertors 38–40. This subsystem comprises a pneumatic to hydraulic convertor generally designated as 38, the pneumatic control input line 79, the dump valve 59, a hydraulic motor 220 and a hydraulic slack adjuster 41. Converter 38 is disclosed in copending application Ser. No. 417,707, filed Nov. 20, 1973, now abandoned but continued-in-part in application Ser. No. 501,939 filed Aug. 29, 1974.

The pneumatic to hydraulic convertor 38 includes a fluid responsive pneumatic motor means. This motor means comprises a working chamber 214 which is defined by the booster housing 215 and the flexible diaphragm member 216. The flexible diaphragm 216 is backed by a reciprocating piston 217 which is fixably attached to a reciprocating connecting rod 218. As illustrated in FIG. 4, when working chamber 214 is pressurized, the flexible membrane 216 and the working piston 217 are displaced to the left thereby actuating a hydraulic motor means generally indicated by the numeral 220. The reciprocating working piston 217 is biased to the position illustrated in FIG. 4 by virtue of a resilient spring means 219 located within the housing of the pneumatic to hydraulic convertor. Housing member 215 also defines a hydraulic sump 215a for storage of hydraulic fluid for the hydraulic motor means 220. Housing member 215 also defines an integral dump chamber 215b and a pair of dump passageways 221 and 222. Since only a portion of the passageways 221 and 222 is illustrated in the cross-sectional portion of FIG. 4, the remaining portion of the passageway is indicated by the dotted lines 221a and 222a. See the FIG. 6.

The interconnection between the working chamber 214 of the fluid responsive pneumatic motor means and the dump chamber 215b is normally closed by means of magnetic dump valve 59 which is interposed between passageways 221 and 222. This interconnection and the operation of the dump valve 59 will be hereinafter later described.

The pneumatic to hydraulic convertor illustrated in FIG. 4 also includes a slack adjusting means generally designated by numeral 41. In operation, air under pressure is supplied through conduit 79 to the fluid responsive pneumatic motor means 214. As the pressure in working chamber 214 increases, it will drive diaphram 216 and piston member 217 to the left as indicated by arrow A in FIG. 4. The force exerted by the flexible diaphragm and piston is transmitted through the connecting rod 218 to hydraulic piston 226 in the hydraulic motor means 220. The hydraulic piston 226 in turn supplies hydraulic fluid under pressure to the slack adjustor 41. The output of slack adjustor 41 is transmitted through hydraulic line 160 to the hydraulic actuators mounted on the disc brakes.

When the control valve 45 has received a signal to de-energize the friction brake subsystem, it will vent control line 17 to reduce the pressure to the variable load valve and conduit 79. As the pressure in conduit 79 and chamber 214 is reduced, the spring means 219 will return piston member 217 to the extreme righthand position illustrated in FIG. 4. As the piston member is withdrawn, the connecting rod 218 returns the hydraulic piston 226 to its extreme righthand position as illustrated in FIG. 4.

The Wheel Slip Dump Valve and Chamber

As was previously indicated, the present invention includes an independent intervening subsystem for detecting and correcting wheel slip. This subsystem is designed to detect differences in speed between axles, and to detect angular deceleration during synchronous slips. The system provides for a rapid reduction in the pneumatic brake cylinder pressure of the sliding truck during brake application when a slip or slide is detected. The system is engineered to provide for failsafe operation through the use of normally de-energized relays and normally deenergized magnet drives which operate the dump valves. The system is made up of three basic subsystems; a detection system, relaty logic, and the magnetic dump valve assembly illustrated in FIGS. 4–6.

The dump valves 59–61 used in the present invention are high-capacity, fast-response, normally closed magnet valves. They are installed in the housing of the pneumatic motor means and normally close a passageway extending between the pneumatic motor means and an integral dump chamber. As illustrated in FIG. 4, the dump chamber 215b is defined by the walls of casing 215 as an integral part thereof.

The present invention uses large high-capacity passageways 221 and 222 to interconnect the working chamber 214 with the dump chamber 215a. These passageways, together with the high capacity dump valve 59, provide almost instantaneous communication between working chamber 214 and the dump chamber 215b. This vastly reduces the response time of the present invention. See FIG. 6.

Figure 6:
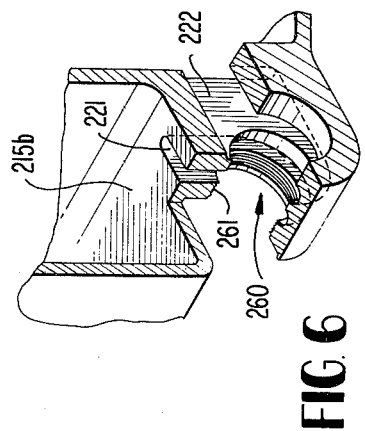
FIG. 6 is an isometric and cross sectional view of the manifold and dump passageway.
Figure 5:
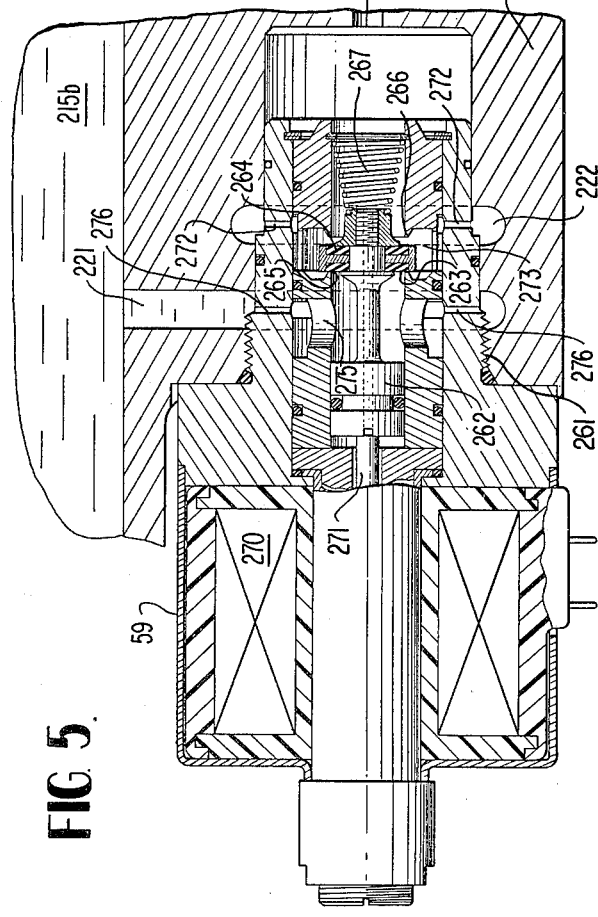
FIG. 5 is a cross sectional view of the dump valve and a portion of the dump chamber.

The dump valve, dump chamber, and the associated passageways between the dump chamber and the pneumatic motor means are illustrated in FIGS. 4, 5 and 6. FIG. 4 illustrates the dump chamber 215b in cross section, with the dump valve 59 arranged immediately below the chamber to provide close communication between the dump chamber 215b and the working chamber 214. The dump chamber 215b is normally exhausted through an exhaust orifice 247 which provides a restricted through passageway from chamber 215b to atmosphere.

FIG. 6 illustrates the dump chamber 215b and the interconnecting passageways 221 and 222 in isometric section. As illustrated in FIGS. 5 and 6, passageway 221 extends from the dump chamber 215b to a central passageway 260 which houses dump valve 59 and interconnects the slotted passageway 221 with slotted passageway 222 when valve 59 is actuated. Casing member 215 also defines a series of threads 261 in the inner periphery of passageway 260 to engage the dump valve 59. This engagement is more fully illustrated in FIG. 5. FIG. 5 illustrates the dump valve and passageways 221 and 222 in cross section. The dump valve 59 is a high-capacity, fast-response two-way normally closed magnet valve. It is rotatably threaded, as illustrated in FIG. 5, into threads 261 to close communication between passageways 221 and 222. Dump valve 59 includes an axially reciprocating spool means 262 having a pair of valve discs 263 and 264 mounted at the end thereof. These valve discs 263 and 264 reciprocate between a first, valve closing seat 265 and a second, valve opening seat 266. Valve disc 263 is normally urged into contact with valve seat 265 by means of resilient spring 267. Dump valve 59 is the subject of application Ser. No. 484,188, filed June 28, 1974.

The dump valve 59 is opened by application of an electrical control signal to the electromagnetic winding 270 which surrounds a reciprocating armature 27. When the electromagnetic coil 270 is energized, it displaces the movable armature 271 to the right as illustrated in FIG. 5, thereby displacing spool 262 to the right and compressing spring 267. As spool 262 is moved to the right, valve disc 263 is unseated from seat 265 thereby opening communication between the working chamber 214, passageway 222, valve inlet passageway 272, the annular seating chamber 273, the axial passageway 275, and the exhaust passageways 276. Exhaust passageways 276 exit into the dump valve passageway 221 defined in casing 215 and to dump chamber, 215b. At the same time disc 264 is moved to the right against annular seat 266 thus sealing off air supply from control valve 45 on line 79. The air in chamber 214 initially expands rapidly into chamber 215b, effecting a rapid reduction in local brake pressure in response to a wheel slip signal and then escapes more slowly via orifice 247, preventing complete pressure loss in chamber 214. When the electromagnet 270 is de-energized, the return spring 267 will unseat valve disc 254 from seat 266 and engage valve disc 263 with valve seat 265 to thereby close communication between annular seating chamber 273 and exhaust passageways 276. This admits air from line 79 and seals the working chamber 214 of the pneumatic motor means thereby preventing any additional pressure drop therein. Thus small adjustments in the pressure in chamber 214 may be made to account for wheel slippage due to changing track conditions; whereas, complete depressurization of chamber 214 is not required. This system is discusssed more fully in my co-pending application Ser. No. 417,707 for Pneumatic to Hydraulic Convertor with Integral Dump Chamber, filed Nov. 20, 1973, which is incorporated herein by reference.

The hydraulic motor means of the present invention includes the hydraulic piston member 226, a hydraulic cylinder 227, and a hydraulic working space 228. Hydraulic fluid is stored in the reservoir 215a which is defined by the external walls of casing member 215. As illustrated in FIG. 4, the hydraulic cylinder 227 is a separate cylindrical member which is inserted into the casing member 215 and secured thereto by the hydraulic slack adjustor and mounting bolts 230. Hydraulic working fluid enters the hydraulic working space 228 through a first working port 231 to insure that the working space 228 is completely filled with hydraulic fluid at all times. A second fluid port 232 is provided which communicates with a second working space 233 that cooperates with piston 226 to transfer additional hydraulic fluid to the working chamber 228 when a slack adjustment has been made by slack adjustor 41. This transfer of fluid during slack adjustor will hereinafter later explained.

Piston member 226 also includes a check valve generally indicated by the numeral 235. The check valve 235 is used to close a passageway 236 which extends through piston member 226. Check valve 235 normally closes communication between the working chamber 228 and the second chamber 233. Passageway 236 allows the transfer of hydraulic fluid from working space 233 to wroking space 228 when a slack adjustment is made by the slack adjustor 41.

The slack adjustor 41 comprises a stepped cylinder 237 and a differential area reciprocal piston means 238. This piston means is formed with a first alrge diameter piston portion 238 and a second smaller diameter piston portion 240 which fit into the corresponding portions of stepped cyliner 237. The piston means 238 divides the cylinder 237 into a pair of working spaces 241 and 242 with the first working space 241 being at the smaller diameter end of the cylinder, and in continuous communication with the working chamber 228 of the hydraulic booster 38. The two working spaces 241 and 242 are normally isolated from each other, but under certain conditions, fluid can be transferred between the spaces through a valve unit 243 installed within the differential piston 238. Under normal working conditions, the valve unit 243 is closed by the hydraulic pressure present in chamber 241, and by its own internal compression spring 244. The valve unit may, however, be unseated by excess pressure present in working space 242. The valve thereby performs a check valve or release function and allows flow from space 242 to space 241 when the pressure in the former exceeds that of the latter by a predetermined amount. The valve means 243 can also be unseated mechanically by means of a push rod 245 which is affixed to the end of the cylinder 237. The push rod is effective to open the valve just before piston 238 reaches the limits of its leftward travel, or approximately 1/16th of an inch before the piston abuts the endcap. The stroke of piston member 238, and the respective volume of chamber 242 determine the clearance between the brake pads and discs.

When the pneumatic to hydraulic convertor is in service, and the brakes are released, the hydraulic motor 220 and the slack adjustor 41 assume their illustrated positions in FIG. 4. When a service brake application is initiated, the pneumatic piston 217 is displaced to the left as hereinbefore previously described. As the piston 217, connecting rod 218, and hydraulic piston 226 are displaced to the left, port 231 is closed and working chamber 228 is pressurized. As chamber 228 is pressurized, the hydraulic fluid in chamber 241 is also pressurized, and this pressurization displaces piston member 238 to the left displacing hydraulic fluid from the working space 242 to the hydraulic brake actuators via conduit 160. If the path clearance is less than that which the slack adjustor 41 is designed to maintain, the brake pads (FIG. 7) will be moved into contact with their respective brake discs before piston member 238 reaches the limit of its leftward movement. At this point, the pressure in working space 242 will rise above the pressure in space 241 as a result of the difference between the cross sectional areas of piston portions 239 and 240. When the pressure differential reaches the setting established by valve unit 243, the valve will be unseated to permit flow of hydraulic fluid from chamber 242 into chamber 241. As a result, the piston member 238 will be shifted all the way to its limiting lefthand position in immediate abutment with the endcap of cylinder 237.

Just before the piston member 238 abuts the endcover, a push rod 245 will open valve means 243 and the hydraulic motor 226 will be in direct communication with the hydraulic actuators of the disc brakes. The pressure developed in the various working chambers 228, 241 and 242, and in the hydraulic actuators will be proportional to the pneumatic command pressure initiated by the control means and presented to the pneumatic motor means and working space 214.

When the service brake is released, the output pressure developed by the control means is exhausted and the spring means 219 returns the piston 217, thereby withdrawing the hydraulic piston 226 to reduce the hydraulic pressure in working spaces 228, 241 and 242. Accordingly, the pressure now present in working chamber 242 will be effective to shift piston 238 to the right to effect closure of valve means 243. As the hydraulic means 226 retracts and withdraws hydraulic fluid from the working space 228, the slack adjustor piston 238 will also shift back towards the initial position and in effect transfer hydraulic fluid from working space 241 to working space 228.

If however, increased wear on the friction brake pads has resulted in a shoe clearance which is initially greater than desired, the slack adjustor functions in the following manner. The slack adjustor piston 238 will reach its lefthand position abutting the end cap of cylinder 237 before the hydraulic actuators have brought the brake pads into contact with the disc. At this point, the push rod 245 will unseat the valve means 243 so that the additional hydraulic fluid required to take up the remaining shoe clearance, and to thereby develop the desired level of braking force can be transferred through valve means 243 to the hydraulic actuators. Since a brake application has caused the piston means 238 to move full stroke into engagement with the endcap of cylinder 237, it follows that the subsequent release of the service brake will cause piston 238 to withdraw from the hydraulic actuators exactly the required quantity of hydraulic fluid. As stated previously, the volume of chamber 242 and the stroke of piston 238 is designed to effect the withdrawal of fluid establishing the proper clearance between the brake pads and the brake disc. Thus it follows that if the shoe clearance is additionally too great, slack adjustor 41 will reduce it to the desired value.

In each of the foregoing situations, the amount of hydraulic fluid returned to the working space 28 and reservoir 215a must be altered. When the shoe clearance is initially too great, the quantity of oil discharged from chamber 228 during the application will necessarily be greater than the quantity returned when the brakes are subsequently released. Therefore, during the release, the slack adjustor piston 238 will return to its initial position and contact abutment 246 before the hydraulic piston 226 has reached its retracted position. In this situation, oil will be transferred from the working chamber 233 to working chamber 228 through inclined passageway 236 and check valve 235. In situations where it is desired to use the booster suction initiated by the withdrawal of piston 226 to augment the retraction forces acting on the hydraulic brakes, the degree of assistance can be increased or decreased by reducing or increasing the diameter of passageway 236 and the design parameters of check valve 235.

The Hydraulic Brake Actuators

Figure 7:
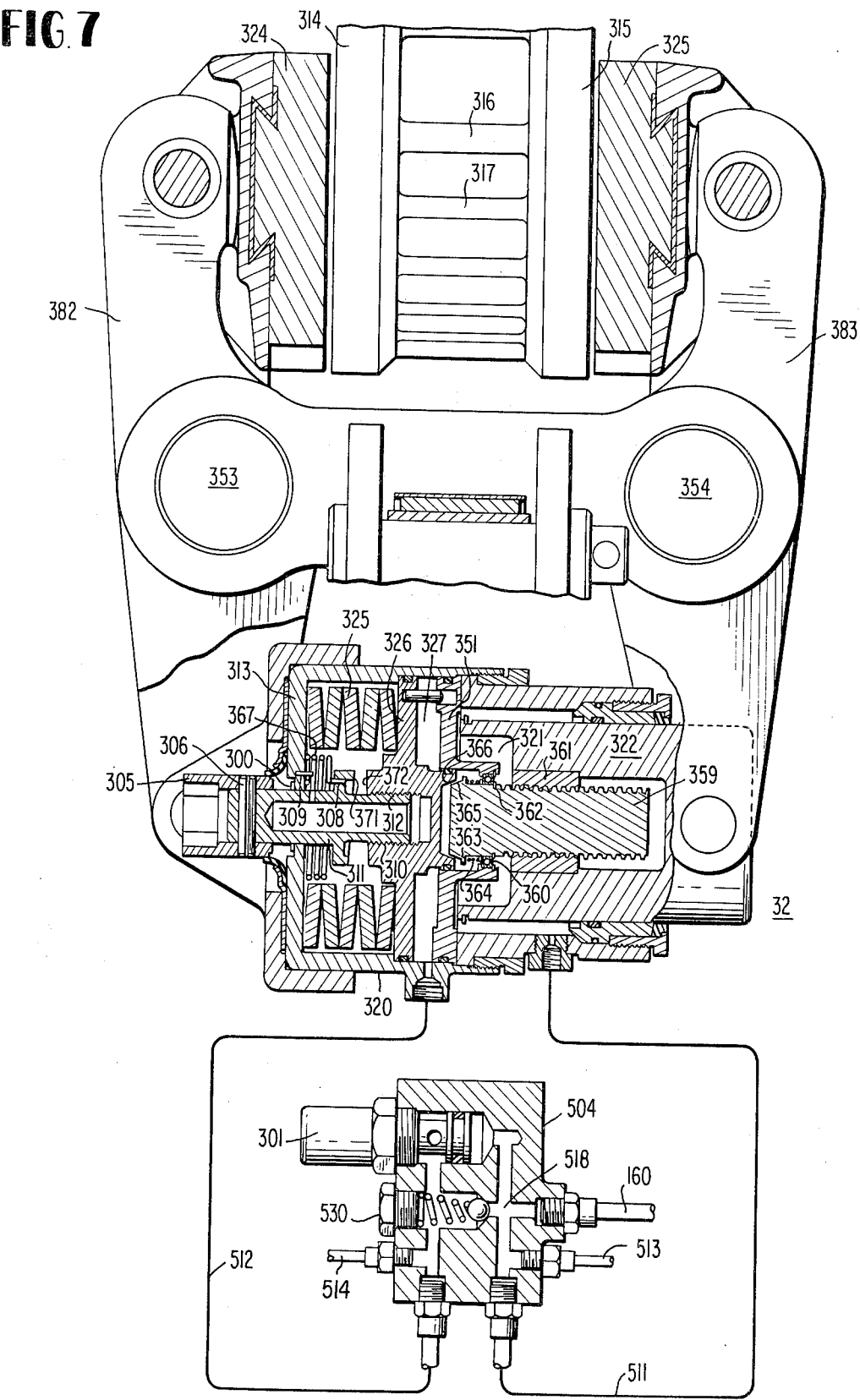
FIG. 7 is a diagrammatic and partially cross sectional view of the emergency and handbrake control system, the hydraulic actuator and the disc brake.

FIG. 7 is a partially cross sectioned view of the emergency and handbrake control system together with disc brake acutator 32. This apparatus is disclosed in copending application Ser. No. 480,439 filed June 17, 1974; and Ser. No. 480,440, filed June 17, 1974. In the preferred embodiment of the invention, the brake system employs disc brakes and hydraulic acutators. Although it would be possible to use pneumatic actuators and a conventional brake system, the use of hydraulic actuators and disc brakes provides precise control that is needed for a fast response brake system. It also provides a substantial reduction in the space required for mounting the cylinders. As illustrated in FIG. 7, each of the wheels is equipped with a segmented disc illustrated by disc 314 and 315. The brake members are mounted on the vehicle truck and define a pair of link arms 382 and 383 for each brake member. Each of the link arms carry friction pads 324 and 325 which bear against the disc 314 and 315.

The friction brake illustrated in FIG. 7 is actuated by a first hydraulic motor 321. The working space of motor 321 exerts hydraulic pressure against piston member 322 and an opposing countervailing force against the rear wall 351 and housing 320. These opposing forces are transmitted to link arms 382 and 383 through pivot points 353 and 354. The opposing forces generated on either side of working space 321 are thus transmitted through the pivot points 353 anad 354 into effective braking force on pads 324 and 325.

The brake actuator illustrated in FIG. 7, also includes a second hydraulic motor 327 and a spring operated motor 325. Under normal operating conditions, spring motor 325 is restrained by hydraulic fluid in working space 327. Upon a reduction in hydraulic pressure, the belleville springs 325 are allowed to exert their working pressure against piston 326 and thereby actuate the disc brake.

Although belleville springs are capable of exerting great force, they exert it only through a very short working space. Thus it is necessary to insure that the brake pads 324 and 325 are always in close contact with the disc 314 and 315. It is desirable in the design of such a brake to have a working space on the order of 187 thousandths of an inch. It is therefore necessary to provide a mechanical slack adjustor to insure that the pressure exerted by the belleville springs is transmitted directly to the brake pads rather than being lost in the slack or play present through normal wear in the mechanical linkage.

To provide this mechanical slack adjustment, a freely rotating lead screw 359 with a suitably steep pitch to its threads is journaled for rotation and reciprocation in bearing means 360. The lead screw 259 is threaded into member 361 which is fixably and rigidly secured to piston member 322. The lead screw 359 is capable of approximately 3/16th of an inch of axial travel and is limited in its axial travel by snap ring 352 and by flange member 363. A spring means 364 is also provided to insure that under normal operating circumstances the lead screw 359 is biased to its leftward position wherein the snap ring 362 engages bearing means 360. Lead screw 359 is also equipped with a conical pressure lead 365. Conical head 365 engages a similar and mating surface 366 formed on the inner periphery of piston 326.

In normal operation, working space 327 is pressurized and piston member 326 is urged to a leftward position maintaining a constant bias on belleville springs 325. When the hydraulic motor 321 is actuated, piston means 322 is displaced to the right as illustrated in FIG. 7, and this displacement will rotate lead screw 359 by means of member 361. Spring means 364 is sufficiently resilient to maintain lead screw 359 within a few thousandths of an inch of its leftward position with the snap ring 362 adjacent bearing 360 even while it is rotating by virtue of the forces exerted on it by member 361 and piston 322. Thus when a service brake application has been made, and disc brake pads 324 and 325 have been brought into contact with disc 314 and 315, the conical head 365 will be held within a few thousandths of an inch of this relative position. When the pressure in working space 321 is vented, the service brakes are de-energized. The disc pads are free to retract to whatever degree the separate hydraulic slack adjustors will permit.

The spacing between 365 and 366 is also maintained under normal operating conditions within a few thousandths of an inch. When the hydraulic fluid in motor 327 is vented, the belleville spring motor 325 will displace piston member 326 to the right, urging it into contact with the conical head 365. Once the working surfaces of 365 and 366 have engaged one another, the lead screw 359 will be secured against any further rotation. At this point, the entire force of the belleville spring motor 325 is exerted through piston member 326, lead screw 359, member 361, and piston 322 to the link arms 382 and 383. The reactive forces are then translated around pivot points 353 and 354 to the brake pads 324 and 325.

The slack adjustor previously described with respect to lead screw 259 is a mechanical slack adjustor intended to compensate for piston motion due to pad wear. It plays no part in service brake operation and does not eliminate the need for hydraulic slack adjustment, which is discussed regarding FIG. 4.

In the preferred embodiment of the invention, the belleville spring motor has a preferred working distance of approximately 3/16 of an inch. This working space must be carefully selected within the belleville spring design parameters since overtravel in the compression direction can destroy the spring, while overtravel in the extension direction will render the spring motor ineffective. In designing this motor, it was assumed that the fully released position for the emergency and handbrake would be achieved with the 542 pounds per square inch of hydraulic working pressure. This pressure is below the normal minimum service pressure for a lightly loaded vehicle. The normal service braking application for an average load vehicle was assumed to be 679 pounds per square inch, and this pressurization on the belleville spring motor 325 resulted in compression of the belleville springs totalling 0.610 inch from their free position, and resulted in compression of the spring piston against its stop at a load of 11,500 pounds per square inch. When the hydraulic motor 327 was vented, and spring motor 325 allowed to apply its fully effective braking force, the maximum overtravel in the extension direction as limited by the stop was approximately 0.180 inch and corresponded to a load of 8,410 pounds per square inch. It is also necessary to provide differentially sized working areas for the first hydraulic motor 321 and the second hydraulic motor 327. This is to insure that the second hydraulic motor 327 would be capable of fully compressing the springs of spring motor 325 even under lightly loaded conditions. The necessity for this will be hereinafter explained with respect to the emergency and parking brake control system.

Once the emergency brake or parking brake has been applied, it is necessary to apply the service brake to de-energize it. The service application fills working space 327 as will be hereinafter later explained, and pressurizes the second hydraulic motor to displace piston 346 to the left as illustrated in FIG. 7 against spring motor 325. FIG. 7 also illustrates in partial cross section a mechanical retraction device for the spring motor 325. As illustrated in FIG. 7, the emergency piston 326 is equipped with internal screw threads 310. These screw threads are engaged by a retraction screw 311 which is equipped with external threads 312. The retraction screw 310 is journaled for rotation in end cap 313 and is restrained from inward axial travel by means of thrust washer 300. Retraction screw 311 is rotated by means of a socket drive wrench which is inserted into a standard socket 305. Socket 305 is fixably secured to retraction screw 311 by means of a pin 366. To retract the emergency piston 326 and compress spring motor 325, a wrench is inserted into socket 305 and rotated in a clockwise manner. Threads 310 and 312 then retract the emergency piston 326 to the left as illustrated in FIG. 7 thereby compressing the spring motor 325.

The retraction device also includes a second spring motor 367 which is pinned to both the retraction screw 311 as illustrated at 308 and to the rear wall 313 as indicated at 309. As the retraction screw and socket is rotated in a clockwise manner, spring member 367 is wound, thereby exerting a counterclockwise torgue on retraction screw 311. However, the force of the belleville spring motor 325 is so great that substantial friction is generated between the threads 310 and 312 and the thrust washer. Even though spring means 367 is exerting an unwinding bias on retraction screw 311, retraction screw 311 is prevented from unwinding by virtue of the friction exerted on screw threads 312 by the spring motor 325.

Lead screw 311 and emergency piston 326 are also equipped with abutments 372 and 371 which provide a definitive stop for any further retraction of the emergency piston 326 by lead screw 311. This prevents an over compression of the belleville spring motor 325 and subsequent jamming of threads 310 and 312.

The retraction device is disengaged by pressurizing the second hydraulic motor 327. When a service application is made, or when the service brakes are cycled, the second hydraulic motor 327 is pressureized as will be hereinafter described. When the pressure in the second hydraulic motor 327 equalizes the bias exerted by spring motor 325, the friction between threads 310 and 312 no longer exists, and the spring means 367 is then free to rotate the retraction screw 311 in a counterclockwise manner to its original position. If desired, the manual retraction device can also be released manually rotating socket 305 with the wrench in a counterclockwise manner to restore lead screw 311 to its original position.

The Emergency And Parking Brake Control System

The braking system of the present invention also includes a separate emergency and parking brake control system which is capable of operating independently and redundantly on each truck of the vehicle. The emergency brake control system uses a hydraulically-restrained spring motor which applies the braking pads to the discs when the system is energized. These brakes may be applied by merely venting or releasing the hydraulic motor which restrains the spring motor. This provides a completely "failsafe" mode of operation wherein the only common component between the emergency system and the service brake system is the brake head and disc pads. This system is also disclosed in application Ser. Nos. 480,439 and 480,440, previously discussed.

The handbrake or parking brake system also uses the hydraulically-restrained spring motor used by the emergency brake system. For both of the systems, a completely separate subsystem is provided for maintaining the hydraulic pressure in the motor which restrains the spring motor.

The control system illustrated in FIG. 1 is equipped with a master pressure switch 15 which indicates a failure of the pneumatic control system to the brake command control center 29. In addition, each of the trucks is equipped with a pressure switch 501, 502 and 503 which are also connected to annunciators in the brake command control center 29. Upon noting a malfunction, the operator may elect to continue the regular service brake application, or to energize the emergency brake system. Additionally, the pressure switches and annunciators will alert the operator to a brake or brake control system that has failed to release.

As discussed previously, the control system illustrated in FIG. 1 is equipped with pneumatic to hydraulic convertors 38, 39 and 40 to supply hydraulic fluid under pressure to the friction brake actuators 32-37. The output of the convertors is piped to a plurality of manifold blocks 504-506 which divert the hydraulic fluid to their respective actuators. Each of the manifold blocks 504-506 is equipped with a companion block 504a-506a for supplying hydraulic fluid under pressure to actuators 33, 35 and 37. Each of the manifold blocks 504-506 is equipped with a magnet valve 301-303 respectively which are operated by electrical signals impressed upon signal control line 304. The signal control line leads to the operator's console and the operating controls for the emergency brake control system 14 and the parking brake control system 10.

Each of the actuators 32-37 has a first hydraulic motor for service brake applications, a spring motor for emergency and handbrake applications, and a second hydraulic motor for restraining the spring brake. Actuator 32 is connected to manifold 504 via a service brake line 511 and an emergency and handbrake control line 512. Conduit 511 defines a first supply line for the service brake actuator, while conduit 512 provides a second supply line for the second hydraulic motor. Likewise, first 513 and second 514 supply lines lead to the second manifold 504a which supplies hydraulic pressure for actuator 33. This hydraulic pressure is supplied along service conduit 516 and emergency and handbrake conduit 517. The use of the first and second supply lines and their associates manifolds is duplicated for each of the remaining actuators 34-37.

The interior piping of manifold 504 is more fully illustrated in cross sectional form in FIG. 7. The incoming supply conduit 160 supplies hydraulic fluid under pressure to junction 518. A portion of this fluid is diverted through the first supply lines 511 and 513 to the service brake portions of actuators 32 and 33. An additional portion of the fluid may be diverted into the emergency and handbrake control system through pressure-responsive check valve 530.

As was previously described with respect to FIG. 7, actuator 32 includes a housing means 320, and a first fluid motor 321 energizing a service brake application. As motor 321 is pressurized, piston 324 is displaced to the right as illustrated in FIG. 7 to bring disc pads 324 and 325 into engagement with disc means 314 and 315.

Actuator 32 also includes a spring motor 125 which exerts pressure against piston 326, conical head 365, and piston 322 to bring the disc pads 324 and 325 into engagement with their respective discs 314 and 315. The actuator also includes a second hydraulic motor means 327 which urges piston 326 to the left as illustrated in FIG. 7, restraining spring motor 325 and rendering it inoperative during service brake applications. Under normal operating circumstances, if the second hydraulic motor 327 is de-pressurized, an emergency or handbrake application is effected by spring motor 325.

The second hydraulic motor 327 is normally pressurized through line 512 by means of manifold 504. The first and second supply lines 511 and 512 are interconnected by means of a pressure-responsive check valve 530 mounted in manifold block 504. As a service brake application is made, line 160 is pressurized. The pressure at junction 518 not only pressurizes line 511, but opens the pressure-responsive check valve 530 to pressurize line 512. When valve 130 is open, hydraulic fluid under pressure flows to the second fluid motor 327 to displace spring motor 325 to the left as illustrated in FIG. 7. When pressure is equalized between lines 511 and 512, the pressure-responsive check valve 530 closes. This prevents any further transfer of hydraulic fluid back from line 512 to line 511 when the service brake application is terminated. After termination, the pressure in line 511 is essentially zero, while the pressure maintained in line 512 is equivalent to the full service brake application pressure. Since in actual practice, the service brake application varies depending upon the weight of the load carried by the vehicle, the pressure present in lines 150 and 511 also vaires. The pressure in line 512 however is equivalent to the highest service brake application previously made, less any leakage from hydraulic motor 327 and/or check valve 530. Since some leakage is inevitable, the system relies on each succeeding service brake application to restore the pressure in a second fluid motor 327 to a level sufficient to prevent the application of spring motor 325.

The system also includes an exhaust valve for exhausting the fluid pressure maintained in conduit 512. When it is desired to make an emergency or handbrake application, exhaust valve 301 is opened and the pressure in conduit 512 is allowed to equalize with the pressure in conduit 511. It is important to note that the pressure present in the second hydraulic motor 527 is not dumped, but is rather equalized with any pressure present in the service brake line 511. If the pressure in conduit 512 were dumped, the emergency piston force from spring motor 325 would add to the service brake force and result in a total brake force more than double that required to stop the car. This would simply lock the wheels and lengthen the stopping distance. That is, if a service brake application is in effect at the time the emergency brake application is made, the addition of the pressure generated by spring motor 326 to the existing service pressure would undoubtedly cause the brake to lock and the wheels of the vehicle to slide.

It is essential in establishing the emergency brake force, that the minimum and maximum service brake pressures be accurately calculated. It is necessary that the minimum service brake pressure that will be supplied under the lightest load conditions be sufficient to overcome the spring motor pressure and restrain it under all conditions. It is also necessary that the spring motor 325 be able to exert braking force equal to that used in the service brake applications applied to the most heavily laden cars. In other words, the spring motor must be capable of supplying a full service application under full load conditions, but must be restrained from application by a pressure equivalent to that applied during the lightest of load conditions. This is done by using the differentially sized hydraulic motors 321 and 327. As illustrated in FIG. 2, the effective area of piston 322 is substantially less than the effective area of piston 326. This enables the spring motor 325 to be sized so that it will exert a pressure equivalent to the maximum service loading that will be present in motor 321. The smaller service pressure equivalent to the lightest load condition when presented to the larger service area of piston 326 is still sufficient to compress spring motor 325 and restrain it from application. If it is assumed that the full service brake application on the lightest car will be 600 pounds per square inch, it would be desirable to size the second hydraulic motor 327 to provide the full retraction of spring motor 325 when 550 pounds of pressure per square inch is applied. The addition of any subsequent pressure up to and including 1,000 pounds per square inch will only cause further compression of spring motor 325 toward its stop.

If the spring motor 325 is intended to provide a force equivalent to a full load service application, or a hydraulic pressure of 1,000 pounds per square inch, it will be necessary to reduce the fore applied by the emergency system if an emergency application is made during a service brake application. If, by virtue of the fact that the car is only partially loaded, the full service brake application pressure is 700 pounds per square inch, the addition of a force equal to an extra 1,000 pounds per square inch from spring motor 125 would immediately lock the brakes and cause the vehicle wheels to skid. To prevent this, the exhaust valve 301 equalizes pressure between the first and second supply lines 511 and 512.

If it is assumed that an emergency application is made during a service application, valve 301 is opened with approximately the same pressure present in both the first and second supply lines 511 and 512. The pressure-responsive check valve 530 will insure that the pressure in line 512 is at least equivalent to the pressure in line 511. If an emergency application is made during a service brake application, equivalent pressures will be present in both lines, and the spring motor 325 will be restrained from applying any additional pressure to piston 322. This will prevent any excessive amount of service brake application to the brake pads 324 and 325. If however, the pressure is failing in the service brake application line 511 and an emergency brake application is made, the spring motor will be applied when the hydraulic pressure present in lines 511 and 512 drops below that normally required for a full service application on a lightly loaded car. The amount of brake application will still be tempered, but will always produce a brake force greater than that required on an empty car.

If, for example, the pressure present in service line 511 drops to 300 pounds per square inch, the differential between 300 pounds per square inch and the application pressure for spring motor 325, that is 500 pounds per square inch, will, when multiplied by the piston area of the second spring motor, give the force that the spring motor will produce. As the area of the second piston is roughly twice that of the service piston, pressure deficiency below the full service pressure will be made up twice by the spring brake. Thus, in this example, the pressure deficiency of 300 psi causes a spring brake application force equal to approximately 500 psi to be added to the still existing 300 psi service brake pressure, thus producing braking force equivalent to a 900 psi service pressure. The additional spring brake force will be applied to piston 322 by spring motor 325. Any further drop in the pressure present in service line 511 will result in a further application of pressure from spring motor 525.

When it is desired to use the control system to actuate the handbrake, valve 301 is opened, and the hydraulic fluid in fluid motor 327 is allowed to dissipate into line 160. This insures that the parking brake will remain fully applied even if the source of hydraulic pressure is de-energized, or if the pneumatic or hydraulic control means for the vehicle truck is disconnected. The mechanical retraction device previously described with respect to FIG. 7 may be used to retract the handbrake in the event it is desired to move the car without energizing the brake control system.

The handbrake is released by actuating the service brake, and cycling the service brake through two or three applications. The cycling of the service brake, and the imposition of fluid pressure on conduit 150 will pressurize fluid motor 327 through one-way valve 530 and the second supply line 512. In the preferred embodiment of the invention, the fluid motor 327 is sized so as to fully release the spring motor 325 with a single service application. However, it would be possible to use smaller capacity slack adjustors 41–43, and cycle the service brake system two or three times to insure the hydraulic motor 327 is fully pressurized, and that spring motor 325 is fully retracted.

While I have thus described the preferred embodiments of the present invention, other variations will be suggested to those skilled in the art. It must be understood that the foregoing description is meant to be illustrative only, and not limitative of the present invention, and all such variations and modifications as are in accord with the principles described herein, are meant to fall within the scope of the appended claims.

I claim:

1. A brake system for vehicles having at least one axle with friction and dynamic brakes and at least one axle with only friction brakes, said system comprising: fluid operated friction brake means for said vehicle, said friction brake means including means responsive to variations in fluid pressure to actuate said friction brake means, said brake means having:

first and second pressure-responsive fluid motors, said first fluid motor being responsive to positive fluid pressure variations to actuate said brake means;

spring motor means responsive to reductions in fluid pressures applied to said second fluid motor to actuate said brake means;

a first fluid pressure control means for providing variations in the fluid pressure applied to the first pressure-responsive fluid motors of said axle having friction and dynamic brakes, said first control means responding to a supplied signal which is inversely proportional to the amount of dynamic braking effort applied to said axle;

a second fluid pressure control means for providing fluid pressure to the first pressure-responsive fluid motors of said axle having friction brakes, said second control means responding to a supplied signal which is independent of the amount of braking effort applied to said axle with friction and dynamic brakes; and a third fluid pressure control means for providing reductions in fluid pressure to said second fluid motors, said third pressure control means being responsive to both emergency braking control signals and parking brake control signals.

2. A brake system for vehicles as claimed in claim 1 wherein:
a. said first and second pressure-responsive fluid motors are hydraulic motors, and
b. said first and second fluid pressure control means include a pneumatic to hydraulic convertor for each pressure control means.

3. A brake system for vehicles as claimed in claim 2 wherein said first and second control means comprises electro-pneumatic transducers for translating an electrical control signal to a pneumatic control pressure.

4. A brake system as claimed in claim 1 wherein said first fluid control means includes:
a. an electropneumatic transducer which responds to electrical variations and control signals supplied by a controller for said dynamic brakes, said transducer including a first and second torque motors, said first torque motor responding to variations in said electrical control signal and said second torque motor responding inversely to variations in the pneumatic output of said fluid control means, the combined output of said torque motors producing variable plot pressures,
b. proportioning valve means for regulating the fluid pressure applied by said transducer, said proportioning valve being responsive to variations in said pilot pressures.

5. A brake system as claimed in claim 2 wherein said pneumatic to hydraulic convertor comprises a hydraulic motor means between said fluid pressure control means and said pressure-responsive hydraulic motors.

6. A brake system for vehicles as claimed in claim 1 wherein:
a. said first and second pressure-responsive fluid motors are hydraulic motors, and
b. manifold means for directing fluid under pressure to said first and second fluid motors, said means including a first supply line for said first fluid motor and a second supply line for said second fluid motor,
c. first valve means actuated by said third control means arranged between and normally blocking communication between said first and second supply lines,
d. pressure-responsive valve means arranged between and establishing one-way communication between said first and second supply lines, said valve means permitting a transfer of fluid under pressure from said first supply line to said second supply line when the former exceeds the latter.

7. An emergency and handbrake control system as claimed in claim 6 wherein each of said motors defines a pressure-responsive working area, and the pressure-responsive working area for said second fluid motor is larger than the pressure-responsive working area for said first fluid motor.

8. An emergency and handbrake control system as claimed in claim 6 wherein said first valve means comprises an electro-magnetic valve which established hydraulic communication between said first and second supply lines in response to an elelctrical control signal from said third control means.

9. A brake system for vehicles as claimed in claim 6, wherein said pressure-responsive valve means comprises a spring loaded ball check valve.

10. A brake system for vehicles as claimed in claim 1 wherein said friction brake means further includes a threaded retraction means for compressing said spring motor means.

11. A brake system for vehicles as claimed in claim 10 wherein said threaded retraction means further includes:
 a. means for manually rotating said threaded retraction means,
 b. resilient means for rotating said threaded retraction means after said spring motor has been retracted,
 c. means for resisting the rotation of said threaded retraction means after said spring motor has been retracted, said means providing for the release and rotation of said threaded retraction means when said second pressure-responsive fluid motor is actuated.

12. A brake system according to claim 2, wherein said pneumatic to hydraulic convertor comprises:
 third pressure-responsive motor means comprising a housing defining a variable volume chamber having a moveable wall, said third motor means being responsive to admission of pneumatic pressure to drive said moveable wall;
 said housing also defining a fixed volume dump chamber adjacent said variable volume chamber for receiving a predetermined portion of the admitted fluid pressure;
 dump valve means responsive to an input control signal to open communication between said variable volume chamber and said dump chamber; and
 hydraulic cylinder and piston means operatively connected to said moveable wall for delivering hydraulic fluid under pressure to said first and second pressure-responsive fluid motors in response to movement of said moveable wall.

13. A brake system according to claim 12, wherein said dump valve includes means for simultaneously stopping admission of pneumatic pressure to said variable volume chamber while opening communication between said variable volume chamber and dump chamber.

14. A brake system according to claim 13, wherein said dump chamber includes an orifice connecting it to atmosphere.

15. A brake system according to claim 5, further comprising a hydraulic slack adjuster operatively connected to said convertor, including a reciprocating reaction element with first and second working chambers on either side thereof, said first working chamber communicating with said convertor, said second working chamber communicating with said first and second pressure-responsive fluid motors; and transfer valve means for permitting the transfer of hydraulic fluid from said first working space to said second working space when the volume in said second working space is at its minimum.

16. A brake system according to claim 1, wherein said first and second pressure-responsive fluid motors comprise first and second pistons, respectively, further comprising:
 two cooperating members connecting said first and second pistons, the first of said members being permitted substantial rotary movement and limited axial movement, and the second of said members being permitted axial but not rotary movement;
 resilient means yieldably permitting greater axial movement of said first member when said brake are applied by said spring motor than when said brakes are applied by said first fluid pressure-responsive motor; and
 retraction means for retracting said handbrake piston, said retraction means including a threaded retraction screw rotatably, slidably mounted in said housing and threadably engaged for axial movement with said second piston during parking brake application, said retraction screw comprising abutting means for limiting axial movement of said screw during retraction, whereby positive retraction of said second piston is provided when said screw is rotated in a first direction, said retraction means further comprising resilient drive means for rotating said screw in the opposite direction when said second pressure-responsive fluid motor is pressurized.

* * * * *